United States Patent
Hamanaka et al.

(10) Patent No.: US 6,942,712 B2
(45) Date of Patent: Sep. 13, 2005

(54) HONEYCOMB FILTER FOR EXHAUST GAS PURIFICATION

(75) Inventors: Toshiyuki Hamanaka, Suzuka (JP); Takashi Harada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 43 days.

(21) Appl. No.: 10/275,121

(22) PCT Filed: Mar. 1, 2002

(86) PCT No.: PCT/JP02/01895

§ 371 (c)(1),
(2), (4) Date: Nov. 1, 2002

(87) PCT Pub. No.: WO02/074417

PCT Pub. Date: Sep. 26, 2002

(65) Prior Publication Data

US 2003/0140608 A1 Jul. 31, 2003

(30) Foreign Application Priority Data

Mar. 16, 2001 (JP) .......................... 2001-075580

(51) Int. Cl.⁷ ............................................. B01D 46/00
(52) U.S. Cl. ......................... 55/523; 55/385.3; 55/484; 55/524; 55/529; 55/DIG. 30
(58) Field of Search ........................... 55/282.3, 385.3, 55/484, 523, 524, 529, DIG. 30; 428/116, 117, 118; 156/89.22

(56) References Cited

U.S. PATENT DOCUMENTS

| | | | | |
|---|---|---|---|---|
| 4,335,783 A | * | 6/1982 | McBrayer et al. ........... 428/116 |
| 4,363,644 A | * | 12/1982 | Sato et al. ..................... 55/523 |
| 5,063,029 A | | 11/1991 | Mizuno et al. |
| 5,207,807 A | * | 5/1993 | Manfre et al. ................. 55/523 |
| 5,702,508 A | * | 12/1997 | Moratalla ..................... 55/523 |
| 5,855,781 A | * | 1/1999 | Yorita et al. .................. 55/523 |
| 5,914,187 A | * | 6/1999 | Naruse et al. ................ 55/523 |
| 6,126,833 A | * | 10/2000 | Stobbe et al. ................. 55/523 |
| 6,328,777 B1 | * | 12/2001 | Benthaus et al. ............. 55/523 |
| 6,669,751 B1 | * | 12/2003 | Ohno et al. ................... 55/523 |
| 2002/0038536 A1 | * | 4/2002 | Best et al. ..................... 55/523 |

FOREIGN PATENT DOCUMENTS

| | | | | |
|---|---|---|---|---|
| DE | 43 07 431 A1 | * | 9/1994 | ............. F01N/3/38 |
| EP | 0 565 879 A1 | | 10/1993 | |
| EP | 1 153 643 A1 | | 11/2001 | |
| EP | 1 291 061 A1 | | 2/2003 | |
| JP | 59-199586 | | 11/1984 | |
| JP | A 3-258347 | | 11/1991 | |
| JP | U 5-27215 | | 4/1993 | |
| JP | A 8-28246 | | 1/1996 | |
| JP | 8-28246 | | 1/1996 | |
| JP | A 2000-102709 | | 4/2000 | |
| JP | A 2000-153117 | | 6/2000 | |
| JP | A 2002-60279 | | 2/2002 | |
| JP | 2002-60279 | * | 2/2002 | ........... B01D/39/20 |

* cited by examiner

*Primary Examiner*—Duane Smith
*Assistant Examiner*—Jason M. Greene
(74) *Attorney, Agent, or Firm*—Oliff & Berridge, PLC

(57) ABSTRACT

A honeycomb filter for exhaust gas purification, possessing a honeycomb structure (1) having a plurality of through-holes which are separated from each other by porous partition walls and plugged alternately at the exhaust gas inlet face (2) and the exhaust gas outlet face (3), wherein the honeycomb structure (1) has a slit (5) possessing an opening at least at the exhaust gas inlet face (2), and the slit (5) is partially filled with a filler (6) in a depth of 3 to 25 times the width (5*d*) of slit from the exhaust gas inlet face (3) toward a flow direction (10) of exhaust gas and a gap (5*e*) is formed inside from a portion of the slit filled with the filler (6). This honeycomb filter for exhaust gas purification has high purification ability, yet possesses high thermal shock resistance, and can be used continuously over a long period.

8 Claims, 4 Drawing Sheets

HONEYCOMB FILTER FOR EXHAUST GAS PURIFICATION

TECHNICAL FIELD

The present invention relates to a honeycomb filter for exhaust gas purification. More particularly, the present invention relates to a honeycomb filter for exhaust gas purification which possesses high thermal shock resistance, and can be used continuously over a long period, yet has a high purification ability for capturing and removing the particulate matter present in a particle-containing fluid such as exhaust gas or the like.

BACKGROUND ART

Recently, the influence of a particulate matter emitted from a diesel engine mounted on truck or the like, on environment has been taken up seriously. As an important means for capturing and removing such a particulate matter, a honeycomb filter for exhaust gas purification is in use.

The honeycomb filter for exhaust gas purification generally has a structure possessing a plurality of through-holes which are separated from each other by porous partition walls and which are plugged alternately at its exhaust gas inlet face and its exhaust gas outlet face. The honeycomb filter captures and removes a particulate matter contained in an exhaust gas, passed through the partition walls in the filter from the open through-holes of the exhaust gas inlet face forcibly.

In such a honeycomb filter for exhaust gas purification, it is necessary to burn and remove, for filter regeneration, the particulate matter deposited in the through-holes (which is a flow path of exhaust gas) periodically or intermittently in order to secure the continuous use of filter.

This combustion of fine carbon particles, however, invites local heating (to high temperatures) of honeycomb filter and a difference in thermal expansion arises between sites of heating to high temperatures and other sites; as a result, thermal stress appears in the honeycomb filter and cracks, etc. are generated, making the continuous use of honeycomb filter very difficult, which is a problem.

As a stress-reducing means for elimination of the above problem, JP-A-59-199586 discloses a honeycomb structure having a large number of through-holes surrounded by partition walls, characterized in that through-holes having at least one slit in the partition walls surrounding the through-holes are provided substantially uniformly at given portions of the honeycomb structure.

In this honeycomb structure, small slits are uniformly distributed therein to increase the freedom of deformation and a reduction in thermal stress is obtained. However, since no consideration is made to the fact that thermal stress appears non-uniformly in various positions of honeycomb structure, the above means has been insufficient for stress reduction of a honeycomb structure used under severe environments where the non-uniformity of temperature distribution in honeycomb structure is larger.

Meanwhile, JP-A-8-28246 discloses a ceramic honeycomb filter of improved durability obtained by dividing a honeycomb structure into a plurality of honeycomb members for thermal stress relaxation and adhering the individual honeycomb members with an elastic sealing material obtained by bonding at least a three-dimensionally interwoven inorganic fiber and inorganic particles with each other via an inorganic binder and an organic binder.

In this honeycomb filter, however, since all the sides of each honeycomb member are adhered with a sealing material for increased durability, the thermal stress relaxation brought about by dividing the honeycomb structure into plurality of honeycomb members is reduced greatly and no sufficient thermal shock resistance has been shown in the continuous use over a long period.

The present invention has been made in view of the above problems and aims at providing a honeycomb filter for exhaust gas purification which has a high purification ability, yet possesses high thermal shock resistance, and can be used continuously over a long period.

DISCLOSURE OF THE INVENTION

The present inventor made a study in order to solve the above problems. As a result, the present inventor found out that the above aim can be achieved by forming a slit in a honeycomb structure at least at the exhaust gas inlet face and filling a filler in a portion of the slit containing its opening at the exhaust gas inlet face, in a given depth. The present invention has been completed based on the above finding.

According to the present invention, there is provided a honeycomb filter for exhaust gas purification, possessing a honeycomb structure having a plurality of through-holes which are separated from each other by porous partition walls and plugged alternately at the exhaust gas inlet face and the exhaust gas outlet face, characterized in that the honeycomb structure has a slit possessing an opening at least at the exhaust gas inlet face, and the slit is partially filled with a filler in a depth of 3 to 25 times the width of the slit from the exhaust gas inlet face toward a flow direction of exhaust gas and a gap is formed inside from a portion of the slit filled with the filler.

In the present invention, the slit is preferably filled with a filler in a depth of 6 to 25 times the width of the slit. Also preferably, the honeycomb structure further has a slit possessing an opening at the exhaust gas outlet face and/or the side of the honeycomb structure. In this case, the slit possessing an opening at the exhaust gas outlet face and/or the side may be filled with a filler at least partially.

Also in the present invention, it is preferred that the honeycomb structure is constituted by bonding a plurality of honeycomb members with a bonding material at each portion of the two opposed sides and the slit is formed between the individual honeycomb members. In this case, it is preferred that the bonding material is composed of the substantially same material as that of the basal body of the honeycomb member or that the bonding material is composed of a material having a strength lower than that of the material of the basal body of the honeycomb member. It is also preferred that the honeycomb members are contacted with each other at least at part of each portion of the two opposed sides not bonded with each other with the bonding material.

Also in the present invention, the filler is preferably composed of a material having a strength and/or Young's modulus lower than those of the material of the basal body of the honeycomb filter and is preferably obtained by bonding at least a three-dimensionally interwoven inorganic fiber and inorganic particles with each other via an inorganic binder and/or an organic binder.

Also in the present invention, the basal body of honeycomb filter preferably contains, as its main crystalline phase, one kind selected from the group consisting of cordierite, silicon carbide, metallic silicon, silicon nitride, alumina, mullite, aluminum titanate and lithium aluminum silicate.

BRIEF DESCRIPTIONS OF THE DRAWINGS

FIGS. 1(a) and (b) schematically show an embodiment of the honeycomb filter for exhaust gas purification according to the present invention. FIG. 1(a) is a perspective view and FIG. 1(b) is a top view of FIG. 1(a).

BEST MODE FOR CARRYING OUT THE INVENTION

Figure 1A:
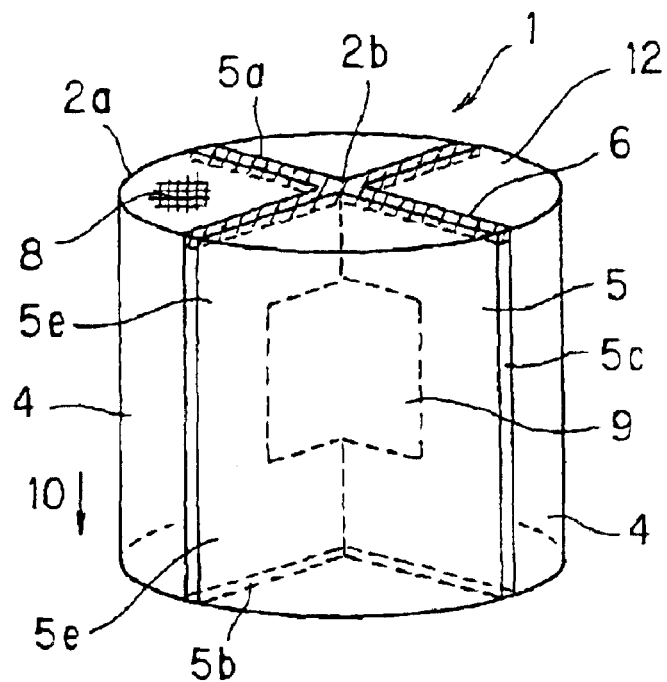

In the honeycomb filter of the present invention, there are formed a slit possessing an opening at least at the exhaust gas inlet face, where the largest thermal stress appears during filter regeneration, and the slit is filled only partially with a filler to form a gap; therefore, the thermal stress relaxation is large, generation of cracks can be prevented greatly even when nonuniform temperature distribution arises in various positions of filter during filter regeneration, etc., and very high thermal shock resistance can be obtained.

Also in the present honeycomb filter, the filler is filled in a portion of the slit including the opening present at the exhaust gas inlet face of filter; therefore, there is no leakage of exhaust gas into the slit, the above-mentioned high thermal shock resistance is achieved, and yet the exhaust gas purification ability can be maintained at a high level.

Embodiments of the present invention are described specifically below. However, the present invention is not restricted to these embodiments.

The honeycomb filter for exhaust gas purification according to the present invention possesses a honeycomb structure having a plurality of through-holes which are separated from each other by porous partition walls and plugged alternately at the exhaust gas inlet face and the exhaust gas outlet face; thereby, the exhaust gas which has entered the filter inside, is forcibly passed through the partition walls and the particulate matter in the exhaust gas can be captured and removed.

There is no particular restriction as to the shape of the honeycomb structure. However, as the sectional shape of honeycomb structure, there can be mentioned, for example, a circle, an ellipse and a race track. There is no particular restriction, either, as to the shape of through-holes (cell shape) of honeycomb structure. However, the sectional shape is preferably a triangle or a tetragon in order to secure the area of capturing. The cell density of through-holes is preferably 6 to 2,000 cells/in.$^2$ (0.9 to 311 cells/cm$^2$), more preferably 50 to 400 cells/in.$^2$ (7.8 to 62 cells/cm$^2$).

In the honeycomb structure of the present invention, the partition walls preferably have a metal having a catalytic activity, loaded thereon, in order to, in using the structure as a means for exhaust gas purification in internal combustion engine or burner, accelerate the combustion and removal of particulate matter captured and conduct filter regeneration effectively. As the metal having a catalytic activity, there can be mentioned, for example, Pt, Pd and Rh. These metals can be used in one kind or in combination of two or more kinds.

As the material for a basal body of the honeycomb structure, there can be mentioned, for example, ceramics each containing, as its main crystalline phase, one kind selected from the group consisting of cordierite, silicon carbide, metallic silicon, silicon nitride, alumina, mullite, aluminum titanate and lithium aluminum silicate.

Among others, preferred are those ceramics each containing, as its main crystalline phase, silicon carbide or metallic silicon and silicon carbide, for their superiority in heat resistance and thermal conduction.

When the ceramic contains metallic silicon and silicon carbide as the main crystalline phase, the Si content defined by Si/(Si+SiC) is preferably 5 to 50% by mass, more preferably 10 to 40% by mass.

In the above range, the bonding by Si is sufficient; therefore, a high thermal conductivity and a high strength can be obtained, and pores can be formed in the partition walls of honeycomb structure so as to have a porosity and a pore diameter which are both suitable for capture and removal of particulate matter.

In the honeycomb filter for exhaust gas purification according to the present invention, such a honeycomb structure has a slit having an opening at least at the exhaust gas inlet face; thereby, an increase in thermal stress relaxation is obtained at the exhaust gas inlet face, where the largest thermal stress appears during filter regeneration, and generation of cracks, etc. can be prevented effectively. Incidentally, the slit used in the present invention is blocked, as described later, with a filler at the opening present at the exhaust gas inlet face.

Various embodiments of the slit of the present invention are specifically described below with reference to the accompanying drawings.

Figure 1B:
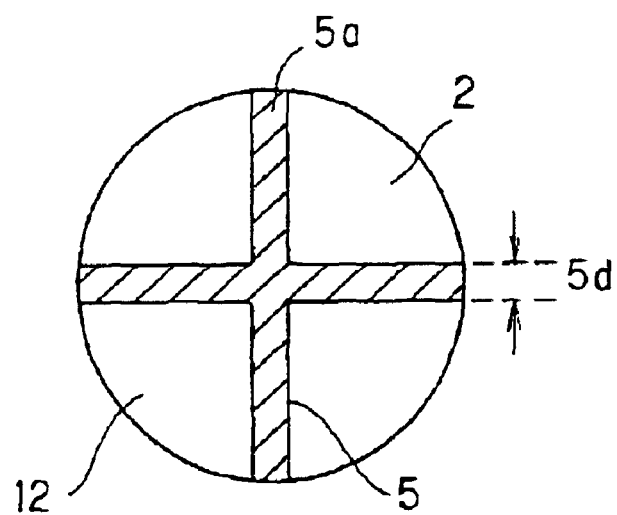

FIGS. 1(a) and (b) schematically show an embodiment of the present invention. FIG. 1(a) is a perspective view and FIG. 1(b) is a top view. FIGS. 2 to 5 are each a perspective view schematically showing an example of the slit pattern in the honeycomb filter for exhaust gas purification according to the present invention and, in these drawings, no filler is shown.

Figure 2:
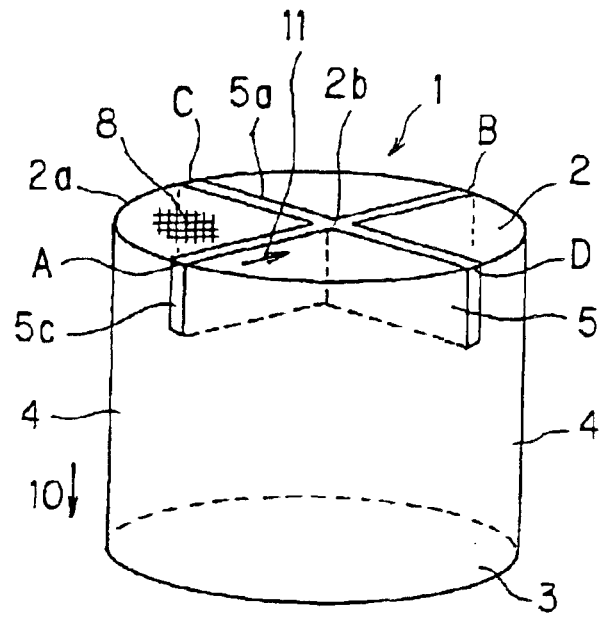
FIG. 2 is a perspective view schematically showing an example of the slit pattern in the honeycomb filter for exhaust gas purification of the present invention.
Figure 3:
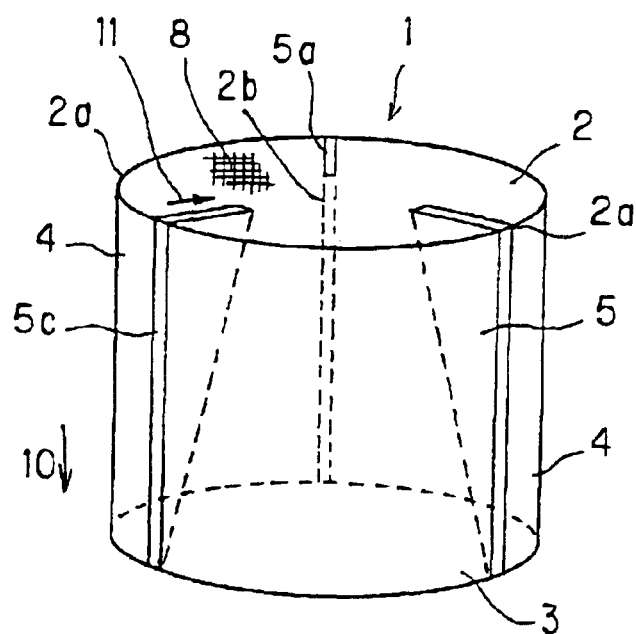
FIG. 3 is a perspective view schematically showing other example of the slit pattern in the honeycomb filter for exhaust gas purification of the present invention.

As the slit in the present invention, there can be mentioned, for example, a type having openings only at the exhaust gas inlet face 2 and side 4 of honeycomb structure 1, as shown in FIG. 2 or 3; and a type having openings at the exhaust gas inlet face 2, exhaust gas outlet face 3 and side 4 of honeycomb structure 1, as shown in FIGS. 1(a), 1(b), 4 and 5.

As the former type, there can be mentioned, for example, a type as shown in FIG. 3, wherein the slit 5 has an opening at the side 4 of honeycomb structure 1 over the entire length of axial direction 10 and is formed so that the length of the slit 5 in a direction 11 extending toward the center of honeycomb structure 1 becomes short gradually; and a type as shown in FIG. 2, wherein the slit 5 has an opening at the side 4 of honeycomb structure 1 in a portion of the entire length of axial direction 10 including the part at which the side 4 and the exhaust gas inlet face 2 meet with each other, and is formed so that the length of the slit 5 in a direction extending the center of honeycomb structure 1 becomes constant in the axial direction of honeycomb structure 1.

Figure 4:
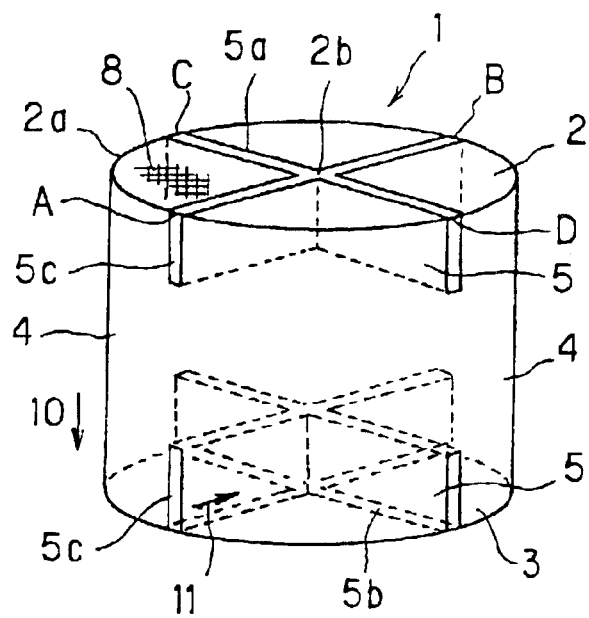
FIG. 4 is a perspective view schematically showing other example of the slit pattern in the honeycomb filter for exhaust gas purification of the present invention.
Figure 5:
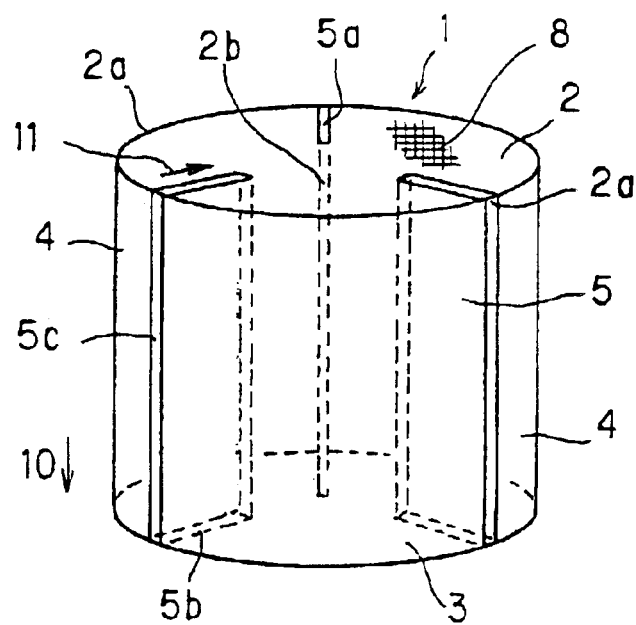
FIG. 5 is a perspective view schematically showing other example of the slit pattern in the honeycomb filter for exhaust gas purification of the present invention.

As the latter type, there can be mentioned, for example, a type as shown in FIG. 5, wherein the slit 5 has an opening at the side 4 over the entire length of axial direction 10 and is formed so that that the length of the slit 5 in a direction 11 extending toward the center of honeycomb structure 1 becomes constant in the axial direction 10 of honeycomb structure 1; and a type as shown in FIG. 4, wherein the slit 5 has an opening at the side 4 of honeycomb structure 1 in a portion of the entire length of axial direction 10 including the part at which the side 4 and the exhaust gas inlet face 2 meet with each other, as well as in a portion of the entire length of axial direction 10 including the part at which the side 4 and the exhaust gas outlet face 3 meet with each other, and is formed so that the length of the slit 5 in a direction 11 extending toward the center of honeycomb structure 1 becomes constant in the axial direction of honeycomb structure 1.

The above types can be made, for example, in such a way that, as shown in FIG. 2 or 4, the slit 5 has, at the exhaust gas inlet face 2 of honeycomb structure 1, a continuous opening which includes two points (A and B, or C and D) of the periphery 2a of inlet face, and the openings 5a of slits intersect with each other at the center 2b of exhaust gas inlet face 2, or, as shown in FIG. 3 or 5, each slit 5 has an opening extending from the periphery 2a of exhaust gas inlet face 2 toward about the center 2b of inlet face 2 and the individual slits 5 have no openings at the center 2b of each face and exist independently from each other.

In the present invention, of these slits, in terms of high thermal stress relaxation efficiency, preferred is a type as shown in FIGS. 1(a) and (b), FIG. 4 or FIG. 5, wherein the slit 5 has openings at the exhaust gas inlet face 2, exhaust gas outlet face 3 and side 4 of honeycomb structure 1; and particularly preferred is a type as shown in FIGS. 1(a) and (b).

As shown in FIGS. 1(a) and (b) to FIG. 5, the slits 5 in the present invention are preferably provided at such positions as to divide a honeycomb structure 1 into at least three equal portions in, for example, its axial direction 10, from the standpoint of increased thermal shock resistance.

It is preferred that at least part of the slit 5 in the present invention extends from the opening at the side of honeycomb structure 1 to a direction 11 toward its center by ¼ of the total width of honeycomb structure 1 in the above direction 11, from the standpoint of increased thermal shock resistance. Similarly, it is preferred that at least part of the slit 5 extends from the opening at the exhaust gas inlet face 2 of honeycomb structure 1 to the flow direction 10 of exhaust gas by ¼ of the total length of honeycomb structure 1 in the direction 10.

The width of a slit 5 is preferably 1 to 3 mm from the standpoint of stress relaxation and filtration efficiency.

Incidentally, the width of slit 5 need not be constant and, when slits 5 are formed in a plurality of locations, each slit 5 may have a different width. Or, for example, a slit 5 having an opening at the side 4 of honeycomb structure 1 over its entire length of axial direction 10 may have such a width that is large around the exhaust gas inlet face 2 or exhaust gas outlet face 3 and small at the middle thereof; thus, a slit 5 may have different widths depending upon the position in the slit 5.

As the method for forming a slit 5, there can be mentioned, for example, the following methods.

First method wherein extrusion is conducted to produce a honeycomb structure extrudate having through-holes 8 and a slit 5.

Second method wherein extrusion is conducted to produce a honeycomb structure extrudate having through-holes 8 and then the extrudate is subjected to a cutting operation to form a slit 5 at desired locations.

Third method wherein extrusion is conducted to produce a plurality of honeycomb member extrudates each having such a shape as can constitute a final honeycomb structure 1 when the extrudates are combined, and these honeycomb member extrudates are bonded with a bonding material at part of their each two opposed sides to form a slit 5 between the honeycomb member extrudates.

In the present invention, it is preferred to form the slit 5 by the third method of the above methods because formation of the slit 5 is easy and large thermal stress relaxation is obtained.

Also in the third method, in order to increase the thermal conductivity of the whole portion of honeycomb structure 1 and reduce the restraint between individual honeycomb members 12 to obtain increased thermal stress relaxation, it is preferred to (1) use a bonding material 9 composed of substantially the same material as that of the basal body of honeycomb member 12 or (2) use a bonding material 9 having a strength lower than that of the basal body of honeycomb member 12 and further contacting honeycomb members 12 with each other at least at part of each non-bonding portion of two opposed sides of honeycomb members 12.

Incidentally, in the above (2), "contact" refers to a state in which thermal conduction exists between honeycomb members and, when deformation appears owing to thermal expansion, the position relationship of contact sides of honeycomb segments can change; and "strength" refers to a value obtained by measurement by a four-point bending strength test using a material testing machine.

The bonding material 9 used in the above (2), similarly to the filler 6 described later, is preferably, for the heat resistance, thermal shock resistance, etc., one kind or a combination of two kinds or more selected from a fiber material or powder composed mainly of a ceramic used in the basal body of honeycomb structure 1, a cement, etc.

Meanwhile, in the present invention, when the basal body of honeycomb member 12 is composed of metallic Si and SiC and the Si content defined by Si/(Si+SiC) is 5 to 50% by mass, it is also preferred that the bonding material 6 is composed of metallic Si and SiC and its Si content defined by Si/(Si+SiC) is the same as or more than in the basal body of honeycomb members 12 to be bonded with each other and is 10 to 80% by mass. In this range, the bonding strength can be maintained at a sufficient level and sufficient oxidation resistance is obtainable at high temperature.

In the present invention, such a slit is filled with a filler at least at a portion including an opening at the exhaust gas inlet face, and a gap is formed inside from the portion filled with the filler; thereby can be obtained a honeycomb filter for exhaust gas purification, high in purification ability and yet high in thermal shock resistance.

In the present invention, the slit is filled with a filler from the exhaust gas inlet face toward the flow direction of exhaust gas, in a depth 3 to 25 times the width of slit, preferably in a depth 6 to 25 times the width of slit, more preferably in a depth of 7 to 25 times the width of slit.

When the depth of filling of filler is less than 3 times the width of slit, the bonding strength between filler and honeycomb structure is low and the filler is peeled owing to the vibration and heat generated during operation. Meanwhile, when the depth is more than 25 times the width of slit, the thermal stress relaxation brought about by the slit is insufficient and rupture of honeycomb structure takes place owing to the thermal stress generated.

Here, "width of slit" in relation to the depth of filling of filler refers, as shown in FIG. 1(b), to a length 5d in a direction perpendicular to the lengthwise direction of slit, in each opening [in FIG. 1(b), only an opening 5a at an exhaust gas inlet face 2 is shown] of the slit 5 at each face [in FIG. 1(b), only an exhaust gas inlet face 2 is shown]. When this length differs depending upon the point of measurement, "width of slit" refers to an average length (an average length when measurement have been made at 10 or more points of equal intervals). Incidentally, since the area of filler 6 (filled in the slit 5) receiving the pressure of exhaust gas has a relation to the width 5d of slit, the bonding strength of the filler 6 filled in the slit 5 needs to become higher when the width 5d of slit is larger. Therefore, the relationship between the width 5d of slit and the depth of filling of filler 6 is important.

The depth of filling of filler 6 is not necessarily the same in all part of the slit 5 filled with a filler 6. It is preferred that, for example, those slits 5 of all slits 5, formed at the exhaust gas inlet face 2 are filled in a larger depth depending upon the pressure of exhaust gas.

Figure 6:
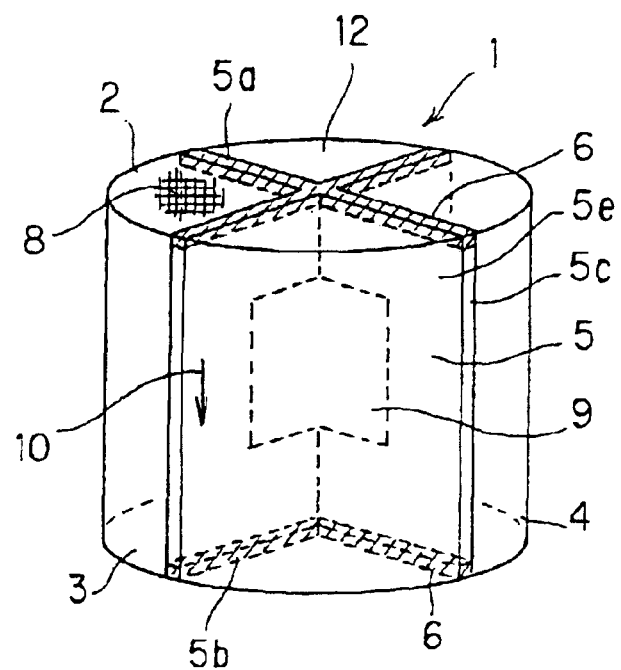
FIG. 6 is a perspective view schematically showing other embodiment of the honeycomb filter for exhaust gas purification of the present invention.
Figure 7:
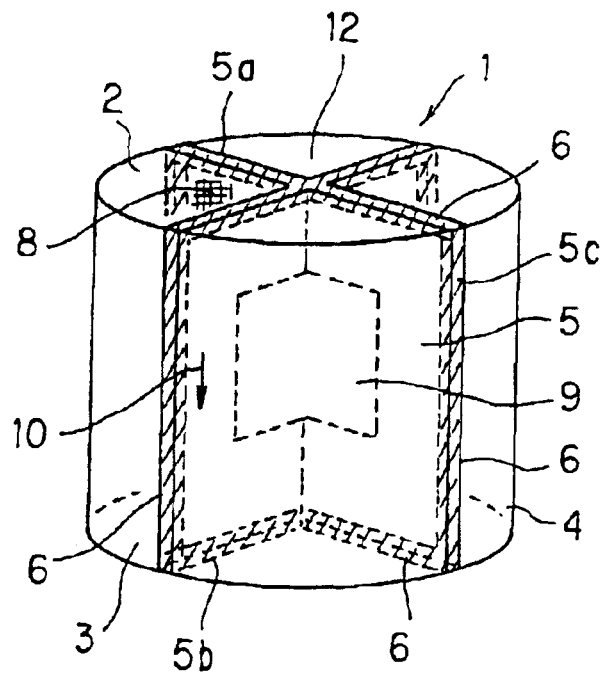
FIG. 7 is a perspective view schematically showing other embodiment of the honeycomb filter for exhaust gas purification of the present invention.

As to the form of filling of filler 6, there are preferred, for example, a form in which, as shown in FIGS. 1(a) and (b), a filler 6 is filled only in an opening 5a of the slit 5 at an exhaust gas inlet face 2 and a gap 5e is formed in other portion of slit 5; a form in which, as shown in FIG. 6, a filler 6 is filled in an opening 5a of each 5 at an exhaust gas inlet face 2 and an opening 5b of slit 5 at an exhaust gas outlet face 3 and a gap 5e is formed in other portion of slit 5; and a form in which, as shown in FIG. 7, a filler 6 is filled in an opening 5a of slit 5 at an exhaust gas inlet face 2, an opening 5b of slit 5 at an exhaust gas outlet face 3 and an opening 5c of slit 5 at a side 4 and a gap 5e is formed in other portion of slit 5.

The filler 6 used in the present invention preferably has a strength and Young's modulus both lower than those of the basal body of honeycomb member 12 in order to obtain a honeycomb structure of large thermal stress relaxation. When the environment of use of honeycomb filter is taken into consideration, however, the filler 6 is preferably superior in heat resistance, thermal shock resistance, etc. and is preferably one kind or a mixture of, for example, a cement, and a material composed mainly of a ceramic containing, as its main crystalline phase, one kind selected from the group consisting of cordierite, silicon carbide, metallic silicon, silicon nitride, alumina, mullite, aluminum titanate and lithium aluminum silicate.

Of these, preferred is a fiber material composed mainly of the above-mentioned ceramic because it has a high elastic modulus and can achieve a greater reduction in thermal stress; more preferred is a material obtained by bonding an inorganic fiber and inorganic particles both composed mainly of the above-mentioned ceramic, with each other via an inorganic binder and/or an organic binder, because it can give a honeycomb structure of increased durability.

Next, description is made on Examples of the honeycomb filter of the present invention. However, the present invention is in no way restricted thereto.

EXAMPLE 1

As a ceramic material, there was used a powder obtained by mixing 75% by mass of a silicon carbide (SiC) powder and 25% by mass of a metallic silicon (Si) powder. To the powder were added methyl cellulose, hydroxypropoxylmethyl cellulose, a surfactant and water, followed by kneading to produce a plastic puddle.

Then, this puddle was subjected to extrusion molding to produce four honeycomb member extrudates that had a partition wall thickness of 0.3 mm, a cell density of 31 cells/cm$^2$, a cylindrical shape shown in FIG. 7 when assembled, and a fan-like sectional shape.

Then, a plurality of these honeycomb member extrudates were dried using a microwave and hot air; thereafter, their through-holes were plugged alternately at the exhaust gas inlet face of extrudate and the through-holes not plugged were plugged at the exhaust gas outlet face of extrudate, to produce dried honeycomb members.

Then, each dried honeycomb member was coated, at portions to become bonding portions after firing, with a bonding material slurry having the same composition as the kneaded material; thereafter, the dried honeycomb members were bonded with each other into a unified body, followed by drying.

Then, the dried unified body was subjected to debindering in a N$_2$ atmosphere at about 400° C., followed by firing in an Ar inert atmosphere at about 1,550° C. After the firing, into each opening present at the exhaust gas inlet face of the slits formed between honeycomb members, was filled a filler slurry containing an aluminosilicate-based fiber, a silicon carbide (SiC) powder, a metallic silicon (Si) powder, an organic binder, an inorganic binder and water, in a depth of 15 mm from the exhaust gas inlet face toward a flow direction of exhaust gas. Into each opening present at the exhaust gas outlet face and side of dried unified body was filled the same filler slurry in a depth smaller than that in each opening at the exhaust gas inlet face.

Lastly, the unified body filled with the filler slurry was dried at about 100° C., whereby was produced a honeycomb filter constituted by a honeycomb structure shown in FIG. 7.

The obtained honeycomb filter had a partition wall thickness of 0.3 mm, a cell density of 31 cells/cm$^2$ and a size of 144 mm (diameter)×152 mm (length). The slits of the honeycomb filter were as follows. Slit width: 2 mm (all slits), slit depth from opening at side toward the center of honeycomb structure: 40 mm, slit depth from opening at exhaust gas inlet face toward axial direction of honeycomb structure: 50 mm, and slit depth from opening at exhaust gas outlet face toward axial direction of honeycomb structure: 50 mm.

The filler (after drying) was measured for strength using a material testing machine according to a four-point bending strength test. As a result, the strength was lower than the strength (measured in the same manner) of the material constituting the basal body of honeycomb structure.

EXAMPLES 2 TO 4 AND COMPARATIVE EXAMPLES 1 TO 2

Honeycomb filters were obtained in the same manner as in Example 1 except that each filler was filled in depths shown in Table 1.

(Evaluation Method)

A filter regeneration test was conducted according to a method shown below, to examine the thermal shock resistance of the honeycomb filter of each Example or each Comparative Example.

First, a ceramic-made nonintumescent mat as a holding material was wound around the outer surface of the honeycomb filter of each Example or each Comparative Example. Each resulting honeycomb filter was forced into a SUS 409-made canning case to obtain canning structures.

Then, a soot-containing combustion gas generated by combustion of a gas oil (a diesel fuel) was allowed to flow into the canning structure from the through-holes open at the exhaust gas inlet face, whereby the soot contained in the exhaust gas was captured inside the honeycomb filter.

Then, each honeycomb filter was allowed to cool to room temperature and then a combustion gas containing a given proportion of oxygen was allowed to enter at 800° C. from the through-holes at the exhaust gas inlet face of honeycomb filter, to burn and remove the soot. Thus, a filter regeneration test was carried out.

In this filter regeneration test, the transition period of increasing the inlet gas temperature to 800° C. and the weight of soot captured were each set at two levels [transition period: standard conditions (300 seconds) and short (240 seconds), amount of soot captured: standard conditions (10 g/liter) and large (14 g/liter)], and regeneration of filter was carried out. Thereafter, generation of cracks at exhaust gas inlet face and peeling of filler were examined. The results are summarized in Table 1.

Incidentally, in Table 1, ○ indicates no generation of cracks and Δ indicates generation of cracks (including even very small cracks).

TABLE 1

| | | | Amount of soot captured | | |
|---|---|---|---|---|---|
| | | Large | | Standard | |
| | | Transition period | | | |
| | | Short | | Standard | |
| Slit width (mm) | Depth of filling (mm) | Cracks | Peeling of filler | Cracks | Peeling of filler |
| Example 1 | 2 | 15 | ○ | No | ○ | No |
| Example 2 | 2 | 6 | ○ | Yes | ○ | No |
| Example 3 | 2 | 12 | ○ | No | ○ | No |
| Example 4 | 2 | 50 | ○ | No | ○ | No |
| Comparative Example 1 | 2 | 4 | ○ | Yes | ○ | Yes |
| Comparative Example 2 | 2 | 80 | Δ | No | Δ | No |

(Evaluation)

As seen from Table 1, under the standard conditions, peeling of filler appeared in the honeycomb filter of Comparative Example 1 in which a filler had been filled in each opening of slit at the exhaust gas inlet face in a depth of less than 3 times the width of slit; and, in the honeycomb filter of Comparative Example 2 in which a filler had been filled in a depth more than 25 times the width of slit, no peeling of filler appeared but cracks generated at the exhaust gas inlet face. In contrast, in any of the honeycomb filters of Examples 1 to 4 in which a filler had been filled in depths of 3 to 25 times the width of slit, neither peeling of filler appeared nor cracks generated at the exhaust gas inlet face.

When the transition period was short (240 seconds) and the amount of soot captured was large (14 g/liter) to increase the thermal stresses at various positions of honeycomb filter, peeling of filler appeared in the honeycomb filter of Example 2 in which a filler had been filled in a depth of 3 times the width of slit; however, in any of the honeycomb filters of Examples 1, 3 and 4 in which a filler had been filler in depths of 6 to 25 times the width of slit, neither peeling of filler appeared nor cracks generated at the exhaust gas inlet face.

Industrial Applicability

As described above, the present invention can provide a honeycomb filter for exhaust gas purification, which has high purification ability, yet possesses high thermal shock resistance, and can be used continuously over a long period.

What is claimed is:

1. A honeycomb filter for exhaust gas purification, possessing a honeycomb structure having a plurality of through-holes which are separated from each other by porous partition walls and plugged alternately at the exhaust gas inlet face and the exhaust gas outlet face, characterized in that the honeycomb structure has a slit possessing an opening at least at the exhaust gas inlet face, and the slit is partially filled with a filler in a depth of 3 to 25 times the width of the slit from the exhaust gas inlet face toward a flow direction of exhaust gas and a gap is formed inside from a portion of the slit filled with the Filler.

2. A honeycomb filter for exhaust gas purification according to claim 1, wherein the slit is filled with a filler in a depth of 6 to 25 times the width of the slit from the exhaust gas inlet face toward a flow direction of exhaust gas.

3. A honeycomb filter for exhaust gas purification according to claim 1, wherein the honeycomb structure further has a slit possessing an opening at the exhaust gas outlet face and/or the side of the honeYcomb structure.

4. A honeycomb filter for exhaust gas purification according to claim 3, wherein the slit possessing an opening at the exhaust gas outlet face and/or the side is filled with a filler at least partially.

5. A honeycomb filter for exhaust gas purification according to claim 1, wherein the filler is obtained by bonding at least a three-dimensionally interwoven inorganic fiber and inorganic particles with each other via an inorganic binder and/or an organic binder.

6. A honeycomb filter for exhaust gas purification according to claim 1, wherein the honeycomb structure is constituted by bonding a plurality of honeycomb members with a bonding material at each portion of the two opposed sides and the slit is formed between the individual honeycomb members.

7. A honeycomb filter for exhaust gas purification according to claim 6, wherein the bonding material is composed of the substantially same material as that of a basal body of the honeycomb member.

8. A honeycomb filter for exhaust gas purification according to claim 6, wherein the bonding material is composed of a material having a strength lower than that of the material of a basal body of the honeycomb member, and the honeycomb members are contacted with each other at least at part of each portion of the two opposed sides not bonded with each other with the bonding material.

* * * * *